United States Patent [19]

Gotoh et al.

[11] 4,454,854

[45] Jun. 19, 1984

[54] EXHAUST GAS RECIRCULATION CONTROL METHOD FOR INTERNAL COMBUSTION ENGINES FOR VEHICLES

[75] Inventors: Osamu Gotoh, Higashikurume; Yutaka Otobe, Shiki, both of Japan

[73] Assignee: Honda Motor Co., Ltd., Tokyo, Japan

[21] Appl. No.: 503,680

[22] Filed: Jun. 13, 1983

[30] Foreign Application Priority Data

Jun. 18, 1982 [JP] Japan .................................. 57-104803

[51] Int. Cl.³ ............................................. F02M 25/06
[52] U.S. Cl. .................................. 123/571; 123/569; 364/431.06; 180/309
[58] Field of Search ............................ 123/571, 569; 364/431.06; 180/309

[56] References Cited

U.S. PATENT DOCUMENTS

| 4,165,722 | 8/1979 | Aoyama | 123/571 |
| 4,191,144 | 3/1980 | Nohira et al. | 123/571 |
| 4,233,947 | 11/1980 | Abo | 123/571 |
| 4,257,381 | 3/1981 | Yuzawa et al. | 123/571 |
| 4,279,235 | 7/1981 | Flaig et al. | 123/571 |
| 4,280,469 | 7/1981 | Ganoung | 123/571 |
| 4,304,210 | 12/1981 | Hayakawa | 123/571 |
| 4,318,385 | 3/1982 | Yamaguchi | 123/571 |
| 4,333,440 | 6/1982 | Eheim | 123/569 |
| 4,380,988 | 4/1983 | Otsuka et al. | 123/571 |
| 4,399,791 | 8/1983 | Kobayashi | 123/571 X |

FOREIGN PATENT DOCUMENTS

| 53-76228 | 7/1978 | Japan | 123/571 |
| 54-16026 | 2/1979 | Japan | 123/571 |
| 55-93950 | 6/1980 | Japan | 123/571 |
| 55-151146 | 11/1980 | Japan | 123/571 |
| 57-168033 | 10/1982 | Japan | 123/571 |
| 2006988 | 5/1979 | United Kingdom | 123/571 |

*Primary Examiner*—Wendell E. Burns
*Attorney, Agent, or Firm*—Arthur L. Lessler

[57] ABSTRACT

An exhaust gas recirculation control method for controlling the recirculation of exhaust gases through an exhaust gas recirculating passageway communicating an exhaust passage of an internal combustion engine for vehicles and an intake passage of same, in response to operating conditions of the engine. The range of the exhaust gas recirculation effecting region of the engine, which is determined by the engine rotational speed and another engine operation parameter indicative of intake air quantity, is varied in response to changes in the vehicle speed. The above exhaust gas recirculation effecting region is defined as a region wherein the engine rotational speed lies between a first predetermined value and a second predetermined value higher than the former, and the above another engine operation parameter shows a value lying between a first predetermined value and a second predetermined value representing an intake air quantity larger than that represented by the first predetermined value thereof on condition that the engine rotational speed remains constant. Preferably, the range of the exhaust gas recirculation effecting region is reduced as the vehicle speed decreases. Further preferably, as the vehicle speed decreases, the above second predetermined value of the another engine operation parameter is set closer to the first predetermined value thereof, and/or the above first predetermined value of the engine rotational speed is set higher values.

8 Claims, 4 Drawing Figures

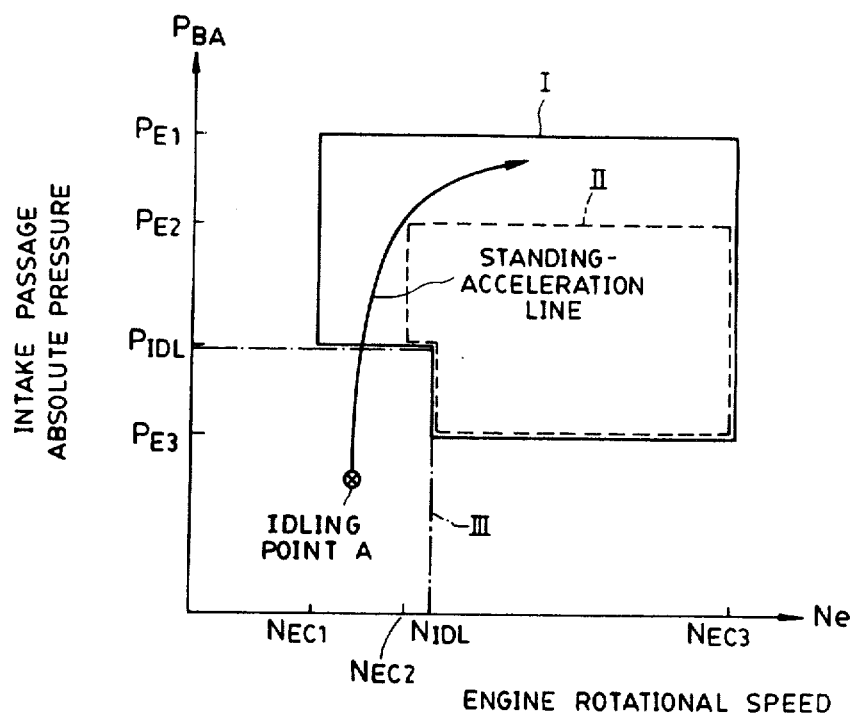

EXHAUST GAS RECIRCULATION CONTROL METHOD FOR INTERNAL COMBUSTION ENGINES FOR VEHICLES

BACKGROUND OF THE INVENTION

This invention relates to an exhaust gas recirculation control method for internal combustion engines for vehicles, and more particularly to a method of this kind which is capable of improving the driveability of the engine upon starting from its standing position, particularly the accelerability, without spoiling the emission characteristics of the engine.

It has already been known and widely practiced to return part of exhaust gases emitted from an internal combustion engine for automotive vehicles to the intake passage of the engine by way of an exhaust gas recirculating passageway during operation of the engine as generally abbreviated as "EGR", so as to restrain an excessive increase in the combustion temperature of an air/fuel mixture supplied to the engine, thereby preventing occurrence of NOx causing air pollution.

While this exhaust gas recirculation is certainly an effective measure for preventing air pollution by exhaust gases, it has the disadvantage that high engine output is not obtained when the exhaust gas recirculation is carried out when the vehicle speed is low, particularly when the vehicle is accelerated from its standing state, badly affecting the accelerability of the engine. For instance, if the engine is accelerated from its idling point, it inevitably enters an operating region wherein the exhaust gas recirculation is to be effected while it is being accelerated, and simultaneously upon entering the above operating region, the exhaust gas recirculation is started. This causes a restrained rise in the combustion temperature and consequent insufficient engine output, degrading the accelerability of the engine.

SUMMARY OF THE INVENTION

It is the object of the invention to provide an exhaust gas recirculation control method for an internal combustion engine for vehicles, which is adapted to carry out the exhaust gas recirculation in a manner responsive to operating conditions of the engine so as to improve the starting driveability, particularly rapid accelerability of the engine, without spoiling the emission characteristics of same.

According to the invention, there is provided an exhaust gas recirculation control method for an internal combustion engine for use in a vehicle, which is characterized by comprising the following steps: (1) setting an operating region of the engine wherein the exhaust gas recirculation is to be effected, as a function of the rotational speed of the engine and another engine operation parameter indicative of the quantity of intake air being supplied to the engine; (2) detecting the speed of the vehicle; (3) detecting the rotational speed of the engine and the value of the above another engine operation parameter; (4) varying the range of the above exhaust gas recirculation effecting region of the engine, in response to a value of the speed of the vehicle detected in the step (2); (5) determining whether or not the engine is operating in the exhaust gas recirculation effecting region varied in the step (4), from values of the rotational speed of the engine and the another engine operation parameter detected in the step (3); and (6) effecting the exhaust gas recirculation while it is determined in the step (5) that the engine is operating in the varied exhaust gas recirculation effecting region.

The exhaust gas recirculation effecting region is defined as a region wherein the rotational speed of the engine lies between a first predetermined value and a second predetermined value higher than the former, and the another engine operation parameter shows a value lying between a first predetermined value and a second predetermined value representing a value of intake air quantity larger than that represented by the first predetermined value on condition that the rotational speed of the engine remains constant.

Preferably, the range of the exhaust gas recirculation effecting region varied in the step (4) is reduced as the speed of the vehicle decreases, and more preferably, as the speed of the vehicle decreases, the range of the exhaust gas recirculation effecting region is varied such that the second predetermined value of the another engine operation parameter is set closer to the first predetermined value thereof, and/or the first predetermined value of the rotational speed of the engine is set to higher values. Further, preferably, the another engine operation parameter is selected from the group consisting of pressure in an intake passage of the engine at a zone downstream of a throttle valve arranged therein, the valve opening of the throttle valve, and the flow rate of intake air.

The above and other objects, features and advantages of the invention will become more apparent from the ensuing detailed description taken in conjunction with the accompanying drawings.

BRIEF DESCRIPTION OF THE DRAWINGS

FIG. 4 is a graph showing the exhaust gas recirculation effecting region according to the method of the invention.

DETAILED DESCRIPTION

The method according to the invention will now be described with reference to the drawings.

Figure 1:
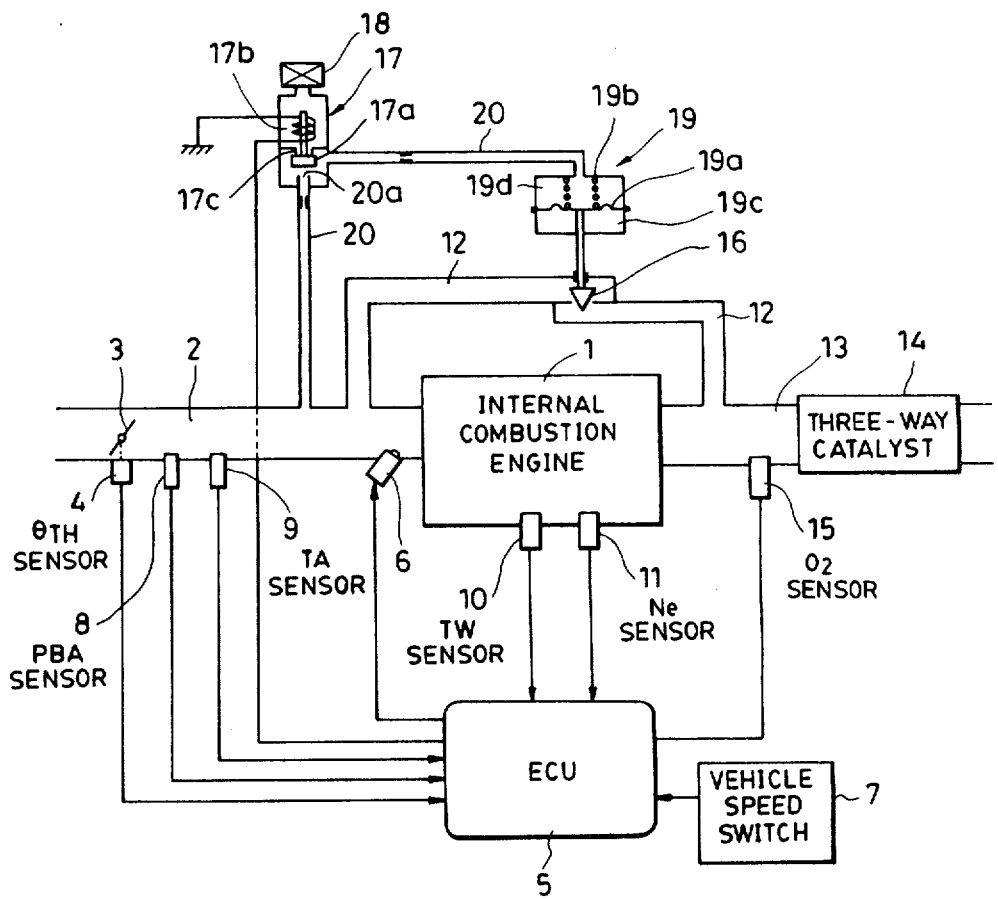
FIG. 1 is a block diagram illustrating, by way of example, the whole arrangement of an exhaust gas recirculation control system to which is applied the method according to the invention.

Referring first to FIG. 1, there is illustrated the whole arrangement of an exhaust gas recirculation control system for an internal combustion engine, to which the method according to the invention is applied. Reference numeral 1 designates an internal combustion engine which may be a four-cylinder type, for instance. An intake pipe 2 is connected to the engine 1, in which is arranged a throttle valve 3, which in turn is coupled to a throttle valve opening ($\theta$TH) sensor 4 for detecting the valve opening of the throttle valve 3 and converting same into an electrical signal which is supplied to an electronic control unit (hereinafter called "ECU") 5.

Fuel injection valves 6 are arranged in the intake pipe 2 at a location intermediate between the engine 1 and the throttle valve 3, which correspond in number to the engine cylinders and are each arranged at a location slightly upstream of an intake valve, not shown, of a corresponding engine cylinder. These injection valves are connected to a fuel pump, not shown, and also electrically connected to the ECU 5 in a manner having their valve opening periods or fuel injection quantities controlled by signals supplied from the ECU 5.

On the other hand, an absolute pressure (PBA) sensor 8 is arranged in the intake pipe 2 at a location immediately downstream of the throttle valve 3. The absolute pressure (PBA) sensor 8 is adapted to detect absolute pressure in the intake pipe 2 and applies an electrical signal indicative of detected absolute pressure to the ECU 5. An intake air temperature (TA) sensor 9 is arranged in the intake pipe 2 at a location downstream of the absolute pressure (PBA) sensor 8 and also electrically connected to the ECU 5 for supplying same with an electrical signal indicative of detected intake air temperature.

An engine temperature (TW) sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rotational speed sensor (hereinafter called "Ne sensor") 11 is arranged in facing relation to a camshaft, not shown, of the engine 1 or a crankshaft of same, not shown. This Ne sensor 11 is adapted to generate one pulse at a particular crank angle of the engine each time the engine crankshaft rotates through 180 degrees, i.e., upon generation of each pulse of a top-dead-center position (TDC) signal. The output signal from the Ne sensor 11 is supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 is a vehicle speed switch 7 which is adapted to supply an on-state signal to the ECU 5 while the speed of a vehicle, not shown, on which the engine 1 is installed, is above a predetermined speed, for instance 15 km/hr.

An exhaust gas recirculating passageway 12 opens at one end in the exhaust pipe 13 at a location upstream of the three-way catalyst 14 and at the other end in the intake pipe 2 at a location downstream of the throttle valve 13 to connect between the exhaust pipe 13 and the intake pipe 2. A control valve 16 is arranged across the exhaust gas recirculating passageway 12 for varying the flow rate of exhaust gases being returned from the exhaust pipe 13 to the intake pipe 2 through the passageway 12. The control valve 16 has its valve body coupled to a diaphragm 19a of a vacuum-responsive actuator 19 which has a lower chamber 19c, a vacuum chamber 19d defined by the diaphragm 19a, and a spring 19b mounted within the vacuum chamber 19d and urging the diaphragm 19a in a direction of closing the control valve 16. The lower chamber 19 communicates with the atmosphere, while the vacuum chamber 19d communicates with the intake pipe 2 at a location downstream of the throttle valve 3, by way of a communication passageway 20. Arranged across the communication passageway 20 is a three way valve 17 formed of a solenoid valve which is arranged such that when its solenoid 17b is energized, its valve body 17a is displaced to block an opening 17c communicating with the atmosphere via a filter 18, while simultaneously opening the communication passageway 20 to allow introduction of negative pressure PB in the intake pipe 2 at a zone downstream of the throttle valve 3 into the vacuum chamber 19d of the vacuum-responsive actuator 19. Upon introduction of the negative pressure PB into ther vacuum chamber 19d, the diaphragm 19a is displaced by the difference between pressures acting upon opposite side surfaces of the diaphragm 19a, against the force of the spring 19b to cause the control valve 16 to open. To be brief, energization of the solenoid 17b of the three way valve 17 causes opening of the control valve 16 to allow return of part of exhaust gases in the exhaust pipe 13 to the intake pipe 2 through the exhaust gas recirculating passageway 12. Next, when the solenoid 17b of the three way valve 17 is deenergized, the valve body 17a now blocks an opposed open end 20a of the communication passageway 20 and at the same time opens the opening 17c to allow atmospheric air to be introduced into the vacuum chamber 19d of the vacuum-responsive actuator 19. Consequently, the difference between pressures acting upon the opposite side surfaces of the diaphragm 19d becomes zero so that the diaphragm 19d is displaced by the force of the spring 19b into a position closing the control valve 16. That is, deenergization of the solenoid 17b of the three way valve 17 causes full closing of the control valve 16 to shut off the return of exhaust gases to the intake pipe 2.

The solenoid 17b of the three way valve 17 is electrically connected to the ECU 5, to be supplied with a control signal responsive to operating conditions of the engine from the ECU 5.

The ECU 5 operates on engine parameter signals from the aforementioned various sensors and an output signal from the vehicle speed switch 7 to determine operating conditions of the engine and supply a control signal to the above three way valve 17 to energize or deernergize same, while calculating the fuel injection period TOUT for the fuel injection valves 6 by the use of the following equation:

$$TOUT = Ti \times K1 + K2$$

where Ti represents a basic value of the fuel injection period, which is calculated as a function of intake pipe absolute pressure PBA and engine rotational speed Ne, and K1 and K2 represent correction coefficients, the values of which are calculated by means of respective equations in response to values of output signals from the throttle valve opening sensor 4, the vehicle speed sensor 7, the intake pipe absolute pressure sensor 8, the intake air temperature sensor 9, the engine water temperature sensor 10, the Ne sensor 11, the $O_2$ sensor 15, to appropriate values which optimize various operating characteristics such as startability, emission characteristics, fuel consumption and accelerability.

The ECU 5 supplies driving signals corresponding to a value of the fuel injection period TOUT calculated as above to the fuel injection valves 6 to energize same.

Figure 2:
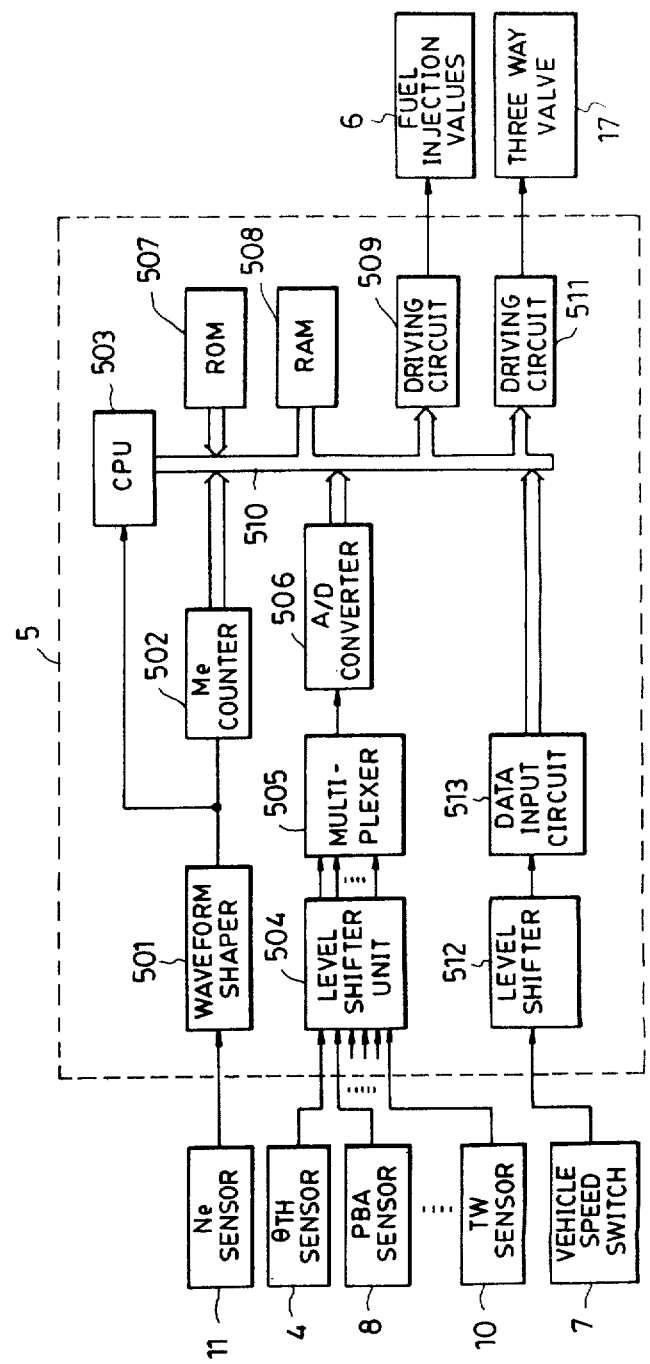
FIG. 2 is a block diagram illustrating, by way of example, the internal arrangement of the electronic control unit (ECU) in FIG. 1.

FIG. 2 shows a circuit configuration within the ECU 5 in FIG. 1. An output signal from the Ne sensor 11 in FIG. 1 is applied to a waveform shaper 501, wherein it has its pulse waveform shaped, and supplied to a central processing unit (hereinafter called "CPU") 503, as the TDC signal, as well as to an Me value counter 502. The Me value counter 502 counts the interval of time between a preceding pulse of the TDC signal and a present pulse of the same signal, inputted thereto from the Ne sensor 11, and therefore its counted value Me corresponds to the reciprocal of the actual engine rpm Ne. The Me value counter 502 supplies the counted value Me to the CPU 503 via a data bus 510.

The respective output signals from the throttle valve opening sensor 4, the intake pipe absolute pressure sensor 8, the engine coolant temperature sensor 10, etc. have their voltage levels successively shifted to a predetermined voltage level by a level shifter unit 504 and applied to an analog-to-digital converter 506 through a multiplexer 505. The analog-to-digital converter 506 successively converts into digital signals analog output voltages from the aforementioned various sensors, and the resulting digital signals are supplied to the CPU 503 via the data bus 510.

The output signal from the vehicle speed switch 7 in FIG. 1 indicative of the on-off state of same is shifted into a predetermined voltage level by a level shifter 512, then converted into a corresponding digital signal by a data input circuit 513, and supplied to the CPU 503 via the data bus 510.

Further connected to the CPU 503 via the data bus 510 are a read-only memory (hereinafter called "ROM") 507, a radom access memory (hereinafter called "RAM") 508, and driving circuits 509 and 511. The RAM 508 temporarily stores various calculated values from the CPU 503, while the ROM 507 stores control programs for control of exhaust gas recirculation, hereinafter described, etc. executed within the CPU 503. The CPU 503 executes the control programs stored in the ROM 507 to determine operating conditions of the engine in response to the values of the above various engine parameter signals and the output signal from the vehicle speed switch 7 in a manner hereinafter described in detail, supply the control signal to the three way valve 17 to energize or deenergize same for control of the exhaust gas recirculating amount, as well as calculate the fuel injection period TOUT for the fuel injection values in response to the exhaust gas recirculating amount. The calculated value of the fuel injection period TOUT is supplied to the driving circuit 509 via the data bus 510, which in turn is responsive to this calculated value to supply control signals to the fuel injection valves 6 to energize same with a duty factor corresponding to the calculated value. On the other hand, the above driving circuit 511 supplies a driving signal to the three way valve 17 to energize or deenergize same.

Figure 3:
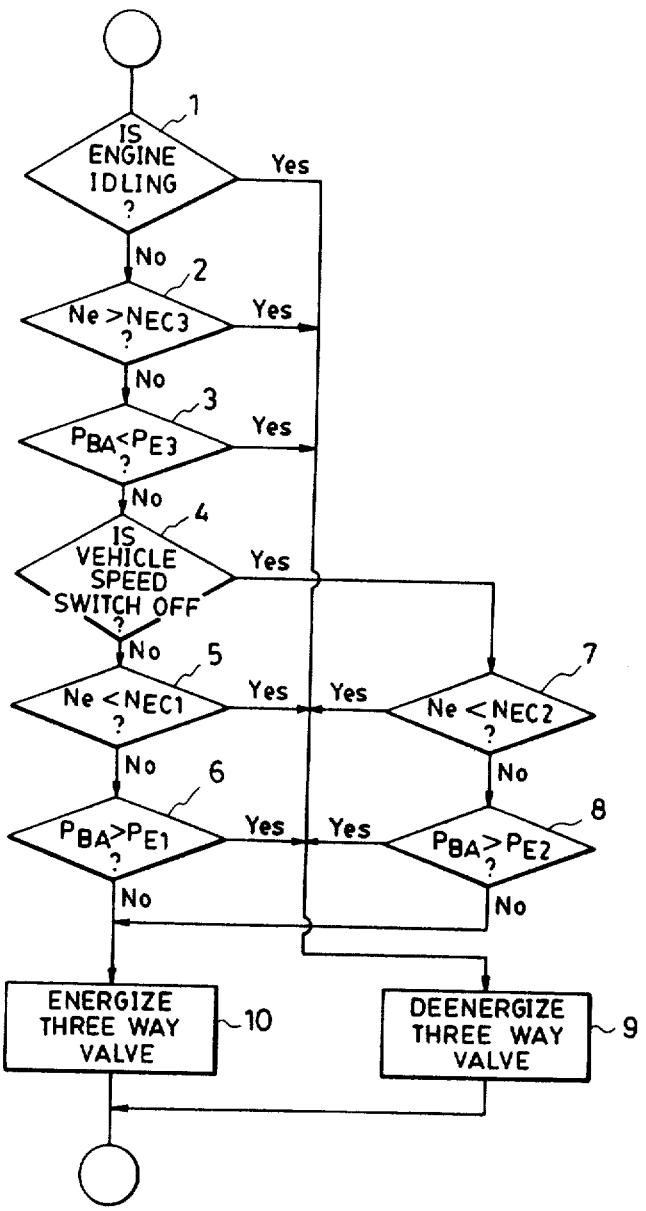
FIG. 3 is a flow chart showing a manner for carrying out the method according to the invention.

FIG. 3 shows a flow chart of a manner for carrying out the exhaust gas recirculation control method according to the invention, that is, a manner of controlling the three way valve 17, which is executed by the CPU 503 in FIG. 2.

First, it is determined at the step 1 in FIG. 3 whether or not the engine is operating in an idling region. The idling region is defined in FIG. 4 as a region III enclosed by the single dot-chain line, wherein the engine rotational speed Ne is lower than a predetermined value NIDL, e.g. 1000 rpm, and the intake pipe absolute pressure PBA is lower than a predetermined value PIDL, e.g. 392 mmHg. When the engine is operating in this idling region, even small fluctuations in the engine load can cause unstable combustion of the mixture within the engine cylinders. Further, in this idling region, the combustion temperature is not so high as requires recirculation of the exhaust gases in order to restrain the occurrence of nitric oxides (NOx), but on the contrary, in this idling region the combustion temperature needs to be elevated so as to restrain the occurrence of unburned hydrocarbon and carbon monoxide. Therefore, when the engine is operating in the idling region, that is, when the answer to the question at the step 1 is yes, the solenoid 17b of the three way valve 17 is deenergized at the step 9, thereby prohibiting the recirculation of exhaust gases.

When it has turned out that the answer to the question at the step 1 is negative, that is, when the engine is not in the idling region, it is then determined at the step 2 whether or not the engine rotational speed Ne is higher than a predetermined value NEC3 (e.g. 5000 rpm). If the answer is yes, the solenoid 17b of the three way valve 17 is deenergized at the step 9 to prohibit the exhaust gas recirculation. When the engine is operating in such high speed region, usually high output torque is required. Therefore, in such high speed region, the exhaust gas recirculation should be prohibited, which also contributes to curtailment of the fuel consumption. If the answer to the question at the step 2 is negative, a determination is made as to whether or not the intake pipe absolute pressure PBA is lower than a predetermined value PE3 (e.g. 263 mmHg). If the answer is yes, the step 9 is also executed to prohibit the exhaust gas recirculation. The fulfilment of the relationship of PBA<PE3 means that the engine is operating in a decelerating condition. In such region where the intake pipe absolute pressure PBA is lower than the predetermined value PE3 or 263 mmHg, incomplete combustion can easily take place within the engine cylinders due to low absolute pressure, and therefore, in many internal combustion engines, in such low absolute pressure region, the fuel supply is cut off. Thus, also in this region, the exhaust gas recirculation is prohibited.

If the answer to the question at the step 3 is negative, the program proceeds to the step 4 to determine whether or not the vehicle speed switch 7 is in its off position. This determination is made to ascertain whether a region I enclosed by the solid line in FIG. 4 or a region II enclosed by the broken line in the figure should be selected for carrying out the exhaust gas recirculation. If the answer to the question at the step 4 is affirmative, that is, when the vehicle speed switch 7 is in the off position corresponding to a value of the vehicle speed lower than the aforementioned predetermined value, e.g. 15 km, the region II is selected, while if the vehicle speed switch 7 is in the on position, the region I is selected.

If the region II is selected, the steps 7 and 8 are executed. That is, if the engine rotational speed Ne is higher than a predetermined value NEC2, e.g. 850 rpm (that is, the answer at the step 7 is no), and at the same time if the intake pipe absolute pressure PBA is lower than a predetermined value PE2, e.g. 614 mmHg (that is, the answer at the step 8 is no), the engine is determined in the region II wherein the exhaust gas recirculation is to be effected. Then, the program proceeds to the step 10 to supply a control signal to the three way valve 17 to energize its solenoid 17b. On the other hand, if the engine rotational speed Ne is lower than the predetermined value NEC2 (the answer at the step 7 is yes), or if the intake pipe absolute pressure PBA is higher than the predetermined value PE2 (the answer at the step 8 is yes), the engine is determined not to be in the region II in FIG. 4, and then the program proceeds to the step 9 to prohibit the exhaust gas recirculation.

On the other hand, when the above region I is selected with the vehicle speed switch 7 in the on position (that is, the answer at the step 4 is no), the determinations in the steps 5 and 6 are executed. If the engine rotational speed Ne is higher than a predetermined value NEC1, e.g. 550 rpm, which is lower than the aforementioned predetermined value NEC2 for determination of the region II (that is, the answer at the step 5 is no), and at the same time, if the intake pipe absolute pressure PBA is lower than a predetermined value PE1, e.g. 680 mmHg, which is higher than the aforementioned predetermined value PE2 (that is, the answer at the step 6 is no), the engine is determined to be in the region I requiring the exhaust gas recirculation. On this occasion, the step 10 is executed to supply a control signal to the three way valve 17 to energize its solenoid 17b. If the engine is determined not to be in the region I, that is, if the engine rotational speed Ne is lower than the predetermined value NEC1 (the answer at the step 5 is yes), or if the intake pipe absolute pressure PBA is higher than the predetermined value PE1 (the answer at the step 6 is yes), the step 9 is executed to prohibit the exhaust gas recirculation.

As stated above, when the vehicle speed is lower than the predetermined value, e.g. 15 km, the range of the exhaust gas recirculation effecting region is reduced from the region I to the region II in FIG. 4. As a consequence, for instance, when the engine is accelerated from an operating condition wherein the throttle valve is in the idling position, that is, from the idling point appearing in FIG. 4, it is possible to avoid that the engine travels through the region II along a path as indicated by the standing-acceleration line in FIG. 4, while it is being accelerated. That is, the engine can be accelerated without being subjected to exhaust gas recirculation, thus to produce high output, thereby exhibiting enhanced accelerability. Further, as noted above, the exhaust gas recirculation effecting region is set to the region II only for a short period of time when the vehicle speed is low, and when the vehicle speed increases to higher speeds afterwards, it is set to the region I. Therefore, the adverse influence upon the emission characteristics of the engine that can be caused by changeover from the region I to the region II can be minimized.

The various predetermined values used for the determinations of the steps 1 through 8 in FIG. 3 may each be provided with a hysteresis margin, i.e. set to different values between when the engine enters the exhaust gas recirculation effecting region and when it leaves same, in order to ensure smooth driveability of the engine.

Although in the foregoing embodiment the intake pipe absolute pressure PBA is employed as one of engine operation parameters for determining whether or not the engine is operating in an exhaust gas recirculation effecting region, any other parameter may be used if only it is representative of intake air quantity, for instance, flow rate of intake air sensed by a flow meter, or throttle valve opening.

What is claimed is:

1. A method for controlling the recirculation of exhaust gases emitted from an internal combustion engine for a vehicle through a passage means connecting between an exhaust passage of said engine and an intake passage thereof, in response to operating conditions of said engine, the method comprising the steps of: (1) setting an operating region of said engine wherein the recirculation of exhaust gases is to be effected, as a function of the rotational speed of said engine and another engine operation parameter indicative of the quantity of intake air being supplied to said engine; (2) detecting the speed of said vehicle; (3) detecting the rotational speed of said engine and the value of said another engine operation parameter; (4) varying the range of said exhaust gas recirculation effecting region of said engine, in response to a value of the speed of said vehicle detected in said step (2); (5) determining whether or not said engine is operating in said exhaust gas recirculation effecting region varied in said step (4), from values of the rotational speed of said engine and said another engine operation parameter detected in said step (3); and (6) effecting the recirculation of exhaust gases while it is determined in said step (5) that said engine is operating in said varied exhaust gas recirculation effecting region.

2. A method as claimed in claim 1, wherein said exhaust gas recirculation effecting region is defined as a region wherein the rotational speed of said engine lies between a first predetermined value and a second predetermined value higher than the former, and said another engine operation parameter shows a value lying between a first predetermined value and a second predetermined value representing a value of intake air quantity larger than that represented by said first predetermined value thereof on condition that the rotational speed of said engine remains constant.

3. A method as claimed in claim 2, wherein said step (4) comprises reducing the range of said exhaust gas recirculation effecting region as the speed of said vehicle decreases.

4. A method as claimed in claim 3, wherein as the speed of said vehicle decreases, said second predetermined value of said another engine operation parameter is set closer to said first predetermined value thereof.

5. A method as claimed in claim 3, wherein as the rotational speed of said vehicle decreases, said first predetermined value of the rotational speed of said engine is set to higher values.

6. A method as claimed in claim 1, wherein said engine includes a throttle valve arranged in said intake passage, said another engine operation parameter being pressure in said intake passage at a zone downstream of said throttle valve.

7. A method as claimed in claim 1, wherein said engine includes a throttle valve arranged in said intake passage, said another engine operation parameter being the valve opening of said throttle valve.

8. A method as claimed in claim 1, wherein said another engine operation parameter is the flow rate of intake air being supplied to said engine.

* * * * *